Patented Dec. 22, 1953

2,663,693

UNITED STATES PATENT OFFICE 2,663,693

NAILABLE MATERIAL FROM NATURAL RUBBER OR BUTADIENE-STYRENE COPOLYMER, PLASTICIZER, CELLULOSE, AND ASBESTOS

Carl B. Hess, New York, N. Y., and Henry M. Richardson, Springfield, Mass., assignors to Brasco Manufacturing Company, Harvey, Ill., a corporation of Delaware No Drawing. Application August 17, 1950, Serial No. 180,096

6 Claims. (Cl. 260—4)

Our invention relates to nailable material, and is a continuation-in-part of application Serial No. 698,391 filed September 20, 1946, now abandoned, and has particular reference to a material comprising a friction producing material, a compressible filler and a vulcanizable binder therefor compounded together into various forms in an uncured state and thereafter cured by vulcanization so that the material is capable of receiving nails driven therein and frictionally holding them in position to a degree somewhat better than ordinary pine wood.

Another and further object of our invention is the provision of a material which possesses both physical stability and inertness, which is termite and vermin proof and which is water resistant and which will not rot and will deteriorate very slowly under normal atmospheric conditions and which is substantially fireproof for ordinary purposes and will not split or splinter and will not shrink or dry out or subsequently crack.

Another and further object of our invention is the provision of a material which may be combined with other materials such as metal by suitable manufacturing processes by means of which the material in various forms can be adhered to metal or may be interposed between metal pieces, usually thin, such as channel sections, thereby producing a structural member for various kinds of building purposes and which will receive and hold nails in the same manner as ordinary wood receives and holds them, and such combinations can be used in a multitude of building and structural operations and also may be combined with such materials as paper and cloth, wood in various forms, as well as glass, building stone and the like.

Another and further object of our invention is the provision of a nailing strip which can be fashioned into any cross sectional form of surface contour that may be desired and which can be readily placed into position and permanently affixed as a part of the structure of an article of furniture, an automobile body, or the like for the purpose of attaching collateral materials such as webbing, upholstery covering, or other material by means of nails, tacks, or staples.

If desired, some or all of the materials can be pigmented during the mixing process so that the material in various colors and combinations thereof can be produced where such colored material may be desired.

Another and further object of our invention is the provision of a nailable material which is superior in holding qualities with respect to nails that are driven into it when compared with wood and which is comparatively cheap to manufacture and which has a wide variety of uses as a substitute for wood where nailability is desired.

Our nailable material consists of a friction material preferably milled asbestos or the like, a compressible filler such as sawdust or comminuted particles of cork and a vulcanizable binder having a rubber base of either natural or synthetic rubber.

As the friction producing element of our material, and forming a part of the filler, we use a fibrous mineral such as asbestos in milled form as distinguished from crude asbestos, preferably using asbestos of the shorter fiber length as classified by the Committee on Uniform Classification and Grading of Asbestos Mines Products in its revised classification of December, 1942, and contained in the publication Canadian Chrystolite Asbestos Classification from the publication Asbestos of Philadelphia, Pennsylvania. We have found that preferably the fiber length of asbestos should be such that it passes through a No. 3 screen (10 mesh) and in quantity should approximate from 40 to 55% by weight of the total mix with a percentage of 48% of the total mix being the most desirable in the production of a material with nail holding force somewhat in excess of that of ordinary pine wood. If too much asbestos is used the penetrability of the material by a nail is rendered difficult, and the material may crack. Likewise, if too small a proportion is used the nail holding force is lessened to such an extent that the material is impractical for the purpose for which it is intended.

As a part of our nailable material we use a compressible particle material such as comminuted wood or cork or a combination of the two materials in a range of from 20% to 35% by weight of the total composition and in a proportion of from two to one or three to two with relation to the friction material. The particle size is important and should not be too large to become an integral part of the material and not so small as to produce, when mixed with the milled asbestos, a material of smooth uniform texture where the identity of the compressible material is lost in the mixture and not evident to the eye when the material is viewed as is the case with our material. The particle size should be such that only a very small percentage would be retained on a 10 mesh screen and only a small percentage would pass through a 40 mesh screen. These filler particles are compressed somewhat in the mixing process of the material but must be of a size where they are compressible when a nail is driven into the material, because the material must possess the quality of compressibility within itself and not erupt on the outer surface around the nail which is common when a nail is driven into rubber or into a material of a rubber-like matrix character as distinguished from our material which has a body composed of the friction material and the compressible particle material with a binder therefor. As a matter of economic production and practice we can use ordinary sawdust as a part of the filler material of a particle size such that at least 50% of the material by weight is retained in a 40 mesh screen, although we find that sawdust of a fineness such that 72% is retained in a 40 mesh screen produces the best nailable material with adequate holding power for a nail and with less danger of the material splitting around the nail or erupting on the surface than if a finer particle size is used. The 28% of smaller particle size does not seem to affect the nailable qualities of the material but becomes blended into the filler to such an extent that its identity is lost in the finished material while the larger sized particles can readily be seen and recognized by the naked eye in the finished material, although firmly bound into it.

The binder consists of a vulcanizable rubber either natural or synthetic, and if synthetic preferably a butadiene-styrene co-polymer known in the trade as the Buna S type is used as a base, to which is added permanent plasticizers and extenders from the group comprising:

*a.* An aromatic unsaturated hydrocarbon oil, reactive with sulfur, and with boiling range generally over 600° F.

*b.* Polymers of indene, coumarone, and associated coal-tar compounds.

*c.* Coal-Tar oil in boiling range 400° F. to 600° F.

Of these, we prefer plasticizer extenders of class "*a*" above because of their permanence and stability after vulcanization. An example of this type of plasticizer extender is known in the trade as Dutrex 6. Considering the binder as made up of approximately 165 parts, the rubber would comprise 100 parts, the plasticizer extender would comprise 50 parts, to which would be added an accelerator for vulcanizing, such as mercaptobenzothiazole or tetramethylthiuramdisulfide, known in the trade as Captex and Tuads, respectively, 1.5 parts; sulphur as a vulcanizing agent, preferably 3 parts; and zinc oxide, preferably 10 parts as an accelerator for the vulcanizing process, although the zinc oxide may be varied from 2 to 10 parts, depending upon the speed desired in vulcanizing the product and also depending upon the quantity of sulphur used for vulcanization purposes. The quantity of sulphur can also be varied according to the particular type of rubber which is used as a base, whether natural or synthetic, and if synthetic, which particular synthetic is used, say up to 10 parts, depending also on the hardness desired in the finished product and the length of time for vulcanizing; all of which is within the skill of a technician engaged in rubber compounding.

In some material we have used 100 parts of a GR-S synthetic rubber, 300 parts asbestos, 150 parts cork and sawdust and 30, 50, and 90 parts of various extender plasticizers, including Dutrex 6. Of this series, the compound including 50 parts of the plasticizer extender gave maximum nail-holding ability. That with 90 parts of extender plasticizer was too tacky to handle conveniently before vulcanizing. In each case, vulcanizing agents, as described above amounting to approximately 20 parts were used.

The quantity of binder is critical to the production of our nailable material. If only 15% is used the material is fragile and difficult to mill, while if 20% binder is used better results are obtainable although 18% makes a satisfactory material. However, from 18% to 25% produces the best results.

In preparing the material, the binder is first compounded by working the rubber in an ordinary rubber mill of the roller or Banbury mixer type and adding the ingredients in the proportions given above during the mixing operations. The friction material and filler such as asbestos and the cork or sawdust as may be preferred has previously been mixed in the quantities desired in the proportions as above set forth, and is gradually added after the compound has been quite thoroughly mixed in the rubber mill in small quantities so that the binder, the friction material and the filler are thoroughly mixed together in as nearly a homogeneous mass as may be possible. This mixing requires some skill on the part of the operator to determine when a thorough mixing of these various ingredients has been obtained. After the thorough mixing of all the ingredients has been done in the usual rubber mill, the ultimate material will preferably be in sheet form of a suitable thickness for the purpose for which the material is to be used.

After the material has been mixed, it will be in a very heavy plastic state and somewhat fragile but it can be extruded, rolled, molded or fashioned to any form that may be desired, depending largely upon the use for which the final material is intended and the kinds and types of equipment used for the vulcanizing process. The material in this intermediate state will be fairly dense and the tensile strength will be quite low due to the plastic condition of the material.

We prefer after fashioning the material into the desired form to vulcanize it, which may be accomplished in a variety of ways in a steam type of vulcanizer under pressure or in an oven, if desired or available, or any other way common in the vulcanizing process. The time for the vulcanization process will depend upon the thickness of the material and other factors, but we have found that material approximately one quarter of an inch thick can be vulcanized sufficiently to secure satisfactory results in a temperature of 310° Fahrenheit for approximately 120 minutes.

Due to the action of the mold when the vulcanizing process is complete, the outer surfaces of the material in contact with the mold are quite smooth simulating the surface of the mold, but are capable of receiving various kinds of adhesives which may be applied thereto for the purpose of securely adhering the material to steel or other materials which provide the containing or backing means for the nailable material. Likewise, if desired, the material can first be fashioned into sheets or other forms, and then vulcanized and thereafter worked in very much the same manner as wood is worked, by sawing, cutting or the like into miscellaneous lengths, shapes and sizes for purposes where ordinary wood could be used, but without the directional or grained properties of wood.

We have found also that the proportion of asbestos to be added is somewhat critical, running between 40% to 55% by weight of the total mixture. If an excessive quantity of asbestos is added the material is so hard that penetration of a nail into the material is difficult. Likewise if an inadequate quantity of friction material is used the frictional holding resistance to the withdrawing of the nail from the material is lessened. The frictional holding power can be increased also by the addition of a somewhat larger quantity of vulcanizing agent, such as sulphur, although this may result in difficulty in penetration of the nail. We have found that the material produced in accordance with the proportion of parts as hereinabove given is desirable and possesses about one-third more holding power than that of a medium soft wood, such as white pine or the like. The binding force of the nail when broken by an initial pull on a nail from ordinary wood, decreases very rapidly as the nail is withdrawn from the material, while the frictional resistance of the material as produced above decreases gradually in proportion to the area of the nail surface in engagement with the material. When the nail is partially withdrawn from the wood a much lesser degree of force is necessary to completely withdraw the nail from the wood, than it is from the nailable composition produced in the proportions and manner hereinabove described.

The material produced in accordance with the foregoing specification is superior to wood because of its uniformity in holding strength, in comparison with wood which varies as whether it is green or seasoned; and various kinds of wood, of course, have varying resistances to nail withdrawal. It makes no difference whether the nail is driven perpendicularly to the plane of the material so far as holding power is concerned and no attention need be paid to grain direction in the use of our material.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or scope of our invention.

What is claimed is:

1. A nailable material comprising 18–25% of a vulcanized rubber composition binder, said binder containing an elastomer selected from the group consisting of natural rubber and a butadiene-styrene co-polymer, said binder also containing a permanent plasticizer selected from the group consisting of coumarone-indene resins, coal tar oil with boiling range over 400° F., and an aromatic unsaturated sulfur-reactive petroleum hydrocarbon oil with boiling range over 600° F., said plasticizer being present in the ratio of 100 parts of elastomer to 30–50 parts of plasticizer; 40–55% of an asbestos friction material and 20–35% of a compressible cellulose fibrous filler whose particle size approximates that of sawdust, all percentages being by weight.

2. The material of claim 1 wherein the cellulose filler is sawdust particles.

3. The material of claim 1 wherein the cellulose filler is sawdust particles of such particle size that at least 50% will remain on a forty mesh screen.

4. The material of claim 1 wherein the cellulose filler is cork particles.

5. The material of claim 1 wherein the cellulose filler is cork particles of such particle size that at least 50% will remain on a forty mesh screen.

6. The material of claim 1 wherein the cellulose filler is sawdust particles of such particle size that at least 50% will remain on a forty mesh screen and the asbestos is of such fiber length that it passes through a ten mesh screen.

CARL B. HESS.
HENRY M. RICHARDSON.

References Cited in the file of this patent

UNITED STATES PATENTS

| Number | Name | Date |
|---|---|---|
| 1,499,863 | Frahm | July 1, 1924 |
| 2,227,533 | Cooke | Jan. 7, 1941 |
| 2,279,450 | Diehl | Apr. 14, 1942 |
| 2,381,248 | Bascom | Aug. 7, 1945 |
| 2,584,959 | Yocom | Feb. 5, 1952 |